United States Patent
Sun et al.

(10) Patent No.: US 12,185,300 B2
(45) Date of Patent: Dec. 31, 2024

(54) CHANNEL STATE INFORMATION REPORTING FOR MULTI-TRANSMISSION-RECEPTION-POINT OPERATION

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Yushu Zhang, Beijing (CN); Hong He, San Jose, CA (US); Chunxuan Ye, San Diego, CA (US); Huaning Niu, San Jose, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 17/437,760

(22) PCT Filed: Mar. 31, 2021

(86) PCT No.: PCT/CN2021/084419
§ 371 (c)(1),
(2) Date: Sep. 9, 2021

(87) PCT Pub. No.: WO2022/205071
PCT Pub. Date: Oct. 6, 2022

(65) Prior Publication Data
US 2022/0361195 A1    Nov. 10, 2022

(51) Int. Cl.
*H04W 72/1263*    (2023.01)
*H04B 17/336*    (2015.01)
(Continued)

(52) U.S. Cl.
CPC ...... *H04W 72/1263* (2013.01); *H04B 17/336* (2015.01); *H04L 5/0051* (2013.01); *H04W 72/54* (2023.01)

(58) Field of Classification Search
CPC .............. H04W 72/1263; H04W 72/54; H04B 17/336; H04L 5/0051
See application file for complete search history.

(56) References Cited

U.S. PATENT DOCUMENTS

| | | | |
|---|---|---|---|
| 11,139,933 B2* | 10/2021 | Xu | H04L 5/0048 |
| 2018/0287682 A1* | 10/2018 | Kwak | H04L 5/0048 |
| 2019/0059013 A1* | 2/2019 | Rahman | H04B 7/0478 |
| 2020/0367193 A1* | 11/2020 | Cha | H04W 48/12 |

(Continued)

FOREIGN PATENT DOCUMENTS

| | | |
|---|---|---|
| CN | 111162826 A | 5/2020 |
| CN | 111970726 A | 11/2020 |

(Continued)

OTHER PUBLICATIONS

International Search Report and Written Opinion for PCT/CN2021/084419; 9 pages; Dec. 29, 2021.

(Continued)

*Primary Examiner* — Deepa Belur
(74) *Attorney, Agent, or Firm* — Kowert, Hood, Munyon, Rankin & Goetzel, P.C.

(57) ABSTRACT

This disclosure relates to techniques for performing channel state information reporting for multi-transmission-reception-point operation in a wireless communication system. Channel state information configuration information may be provided to a wireless device. The channel state information configuration information may indicate channel measurement resources associated with each of multiple transmission reception points. The wireless device may perform channel state information reporting based on the channel state information configuration information.

20 Claims, 7 Drawing Sheets

(51) Int. Cl.
*H04L 5/00* (2006.01)
*H04W 72/54* (2023.01)

(56) References Cited

U.S. PATENT DOCUMENTS

| | | | |
|---|---|---|---|
| 2021/0184750 A1* | 6/2021 | Gao | H04W 76/11 |
| 2021/0211176 A1* | 7/2021 | Gao | H04B 7/0626 |
| 2022/0239358 A1* | 7/2022 | Kim | H04B 17/336 |
| 2023/0053790 A1* | 2/2023 | Khoshnevisan | H04L 5/0048 |
| 2023/0125760 A1* | 4/2023 | Fan | H04B 17/309 |
| | | | 370/252 |
| 2023/0209368 A1* | 6/2023 | Lee | H04B 7/06958 |
| | | | 370/252 |
| 2023/0216566 A1* | 7/2023 | Sun | H04W 24/10 |
| | | | 370/329 |
| 2023/0262503 A1* | 8/2023 | Liu | H04B 7/0695 |
| | | | 370/252 |
| 2023/0361832 A1* | 11/2023 | Hao | H04B 7/0456 |

FOREIGN PATENT DOCUMENTS

| | | |
|---|---|---|
| CN | 112292880 A | 1/2021 |
| CN | 112292894 A | 1/2021 |
| WO | 2019233352 A1 | 12/2019 |
| WO | 2020059146 | 3/2020 |
| WO | WO-2022157932 A1 * | 7/2022 ............ H04W 16/26 |

OTHER PUBLICATIONS

Spreadtrum Communications "Discussion on Multi-TRP transmission"; 3GPP TSG RAN WG1 #98bis R1-1910023; Chongqing, China; 14 pages; Oct. 20, 2019.

Extended European Search Report for EP Patent Application No. 21933747.4; Oct. 24, 2024.

Mediatek Inc. "CSI enhancement for multi-TRP"; 3GPP TSG RAN WG1 #103-e R1-2008960; Oct. 26, 2020.

* cited by examiner

CHANNEL STATE INFORMATION REPORTING FOR MULTI-TRANSMISSION-RECEPTION-POINT OPERATION

PRIORITY CLAIM INFORMATION

This application is a U.S. National Stage application of International Application No. PCT/CN2021/084419, filed Mar. 31, 2021, titled "Channel State Information Reporting for Multi-Transmission-Reception-Point Operation", which is hereby incorporated by reference in its entirety.

FIELD

The present application relates to wireless communications, and more particularly to systems, apparatuses, and methods for performing channel state information reporting for multi-transmission-reception-point operation in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing channel state information reporting for multi-transmission-reception-point operation in a wireless communication system.

According to the techniques described herein, channel state information configuration information may be provided to a wireless device that configures channel measurement resources associated with different transmission-reception-points. The channel measurement resources may be indicated in a manner that supports the wireless device being able to determine that different channel measurement resources are associated with the different transmission-reception-points; for example, different sets of channel measurement resources may be indicated, where each set of channel measurement resources is associated with a different transmission-reception-point.

It may also be possible that the channel state information configuration information configures one or more pairs of channel measurement resources, such that each channel measurement resource of such a pair of channel measurement resources is associated with a different transmission-reception-point. This may help support efficient multi-transmission-reception-point channel measurement and reporting for potential multi-transmission-reception-point operation for the wireless device, at least in some instances.

Additionally, several possible techniques for configuring interference measurement resources and/or for mapping channel measurement resources to interference measurement resources are described herein, including for scenarios in which one or more pairs of channel measurement resources are configured. Such techniques may help support the ability of the wireless device to perform multi-transmission-reception-point interference measurement and reporting for potential multi-transmission-reception-point operation for the wireless device, at least in some instances.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
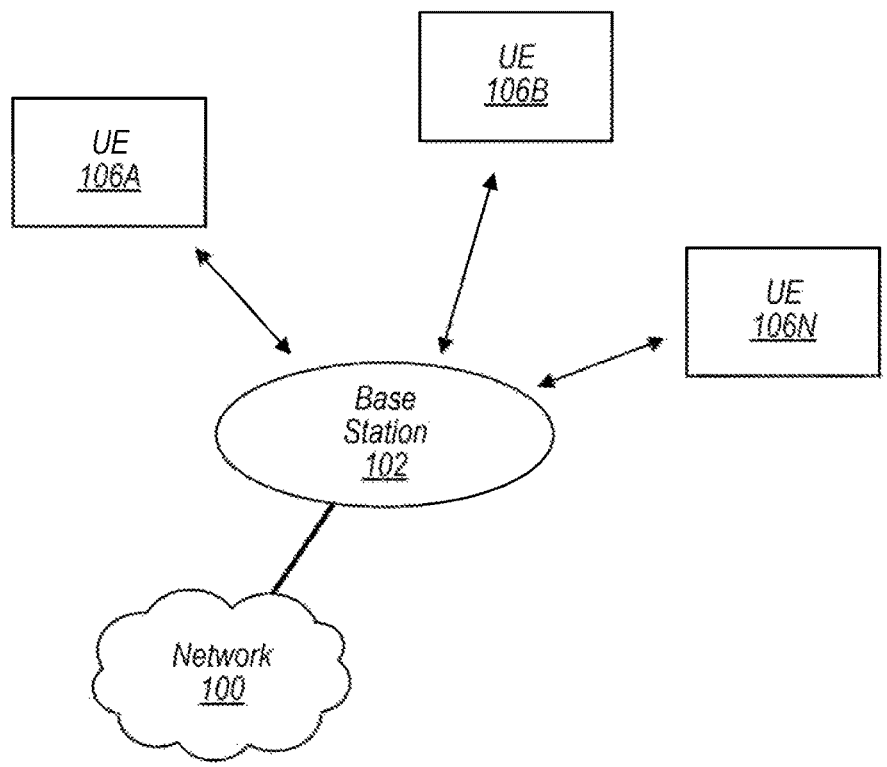
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Measurement
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
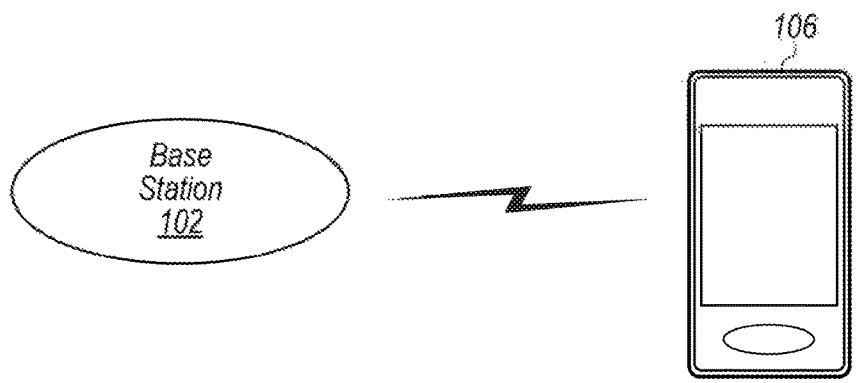
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for performing channel state information reporting for multi-transmission-reception-point operation in a wireless communication system, such as according to the various methods described herein.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
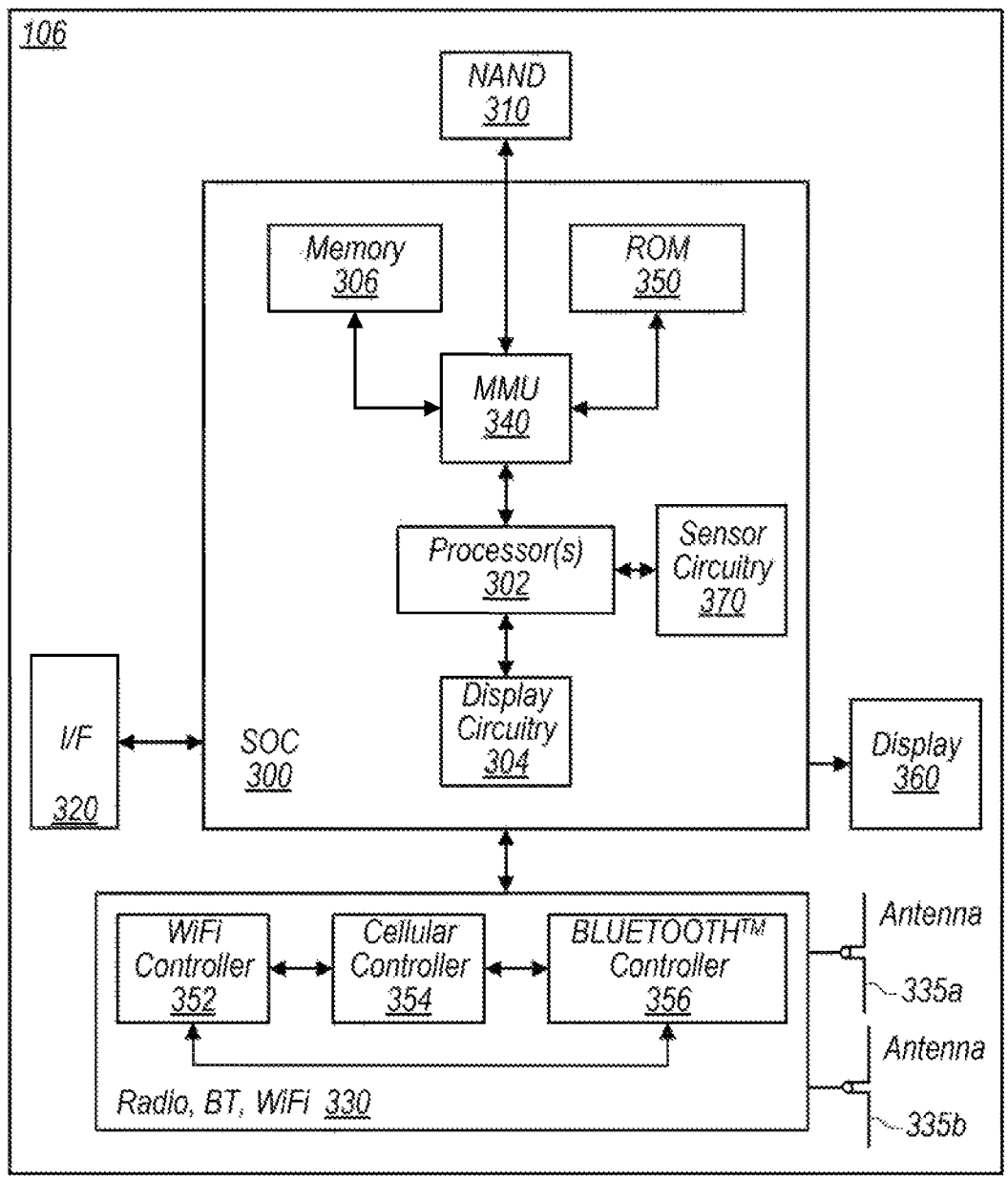
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for performing channel state information reporting for multi-transmission-reception-point operation in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for performing channel state information reporting for multi-transmission-reception-point operation in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
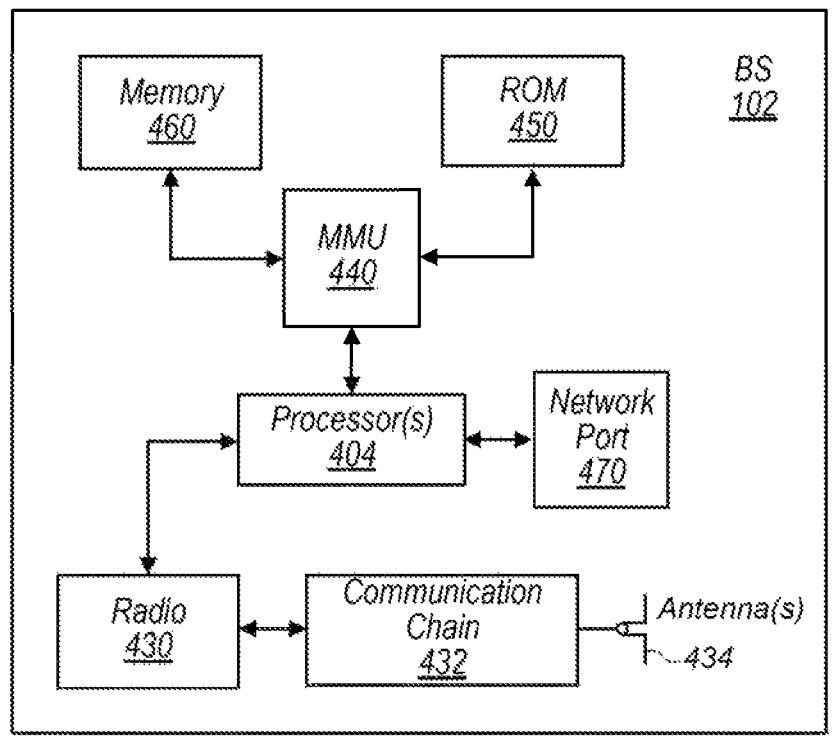
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In most cellular systems, the base station transmits a pilot signal (or a reference signal), such as channel state information reference signals (CSI-RS), where this reference signal is used for estimating a channel (or a portion of a channel) between the base station and a UE. The UE receives this reference signal and based on this reference signal calculates channel state information (CSI). The UE then reports this channel state information back to the base station. The base station may then generate downlink data based on the received CSI and transmit this downlink data to the UE. Stated another way, the base station may adjust the manner in which downlink data is coded and generated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UTE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
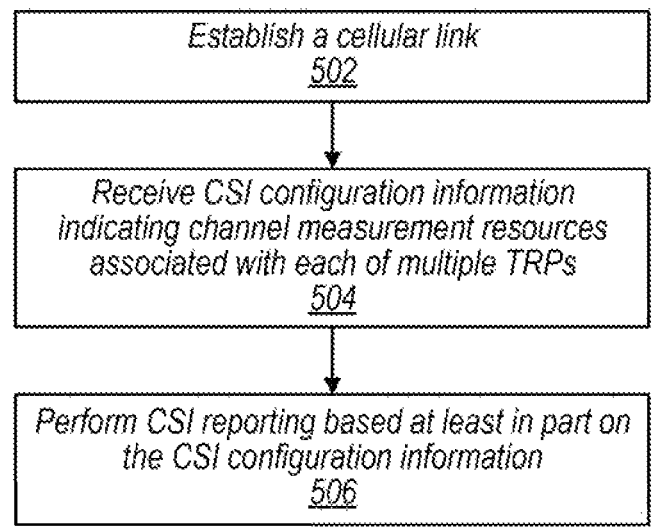
FIG. 5 is a flowchart diagram illustrating aspects of an exemplary possible method for performing channel state information reporting for multi-transmission-reception-point operation in a wireless communication system, according to some embodiments.

FIG. 5—Channel State Information Reporting for Multi-Transmission-Reception-Point Operation According to some cellular communication technologies, it may be possible for a wireless device to communicate with multiple transmission-reception-points (TRPs), including potentially simultaneously. Such communication can be scheduled using downlink control information (DCI), which may be provided using control signaling such as on a physical downlink control channel (PDCCH) that may be transmitted in one or more control resource sets (CORESETs). The DCI can be provided in a single DCI mode, in which communications between multiple TRPs and a wireless device can be scheduled using a single DCI communication (e.g., from just one TRP), or in a multi-DCI mode, in which each of multiple TRPs can provide DCI communications scheduling their own communications with a wireless device.

The communications that are scheduled in such a multi-TRP scenario can include data communications (e.g., which may be transmitted using a physical downlink shared channel (PDSCH), and/or aperiodic channel state information reference signal (CSI-RS) transmissions, among various possibilities. Further, aperiodic CSI-RS transmissions can include CSI-RS that are configured for multiple possible purposes, such as for beam management, tracking, or CSI acquisition.

Currently, support for CSI reporting for multi-TRP operation remains limited. Improvements in CSI reporting configuration and performance may accordingly improve network and wireless device efficiency, e.g., by providing support for explicit interference hypothetical testing for each of multiple TRPs, for supporting efficient switching between single TRP and multi-TRP operation, and/or in any of various other ways.

Thus, it may be beneficial to specify techniques for supporting effective channel state information reporting for multi-TRP scenarios. To illustrate one such set of possible techniques, FIG. 5 is a flowchart diagram illustrating a method for performing channel state information reporting for multi-TRP operation in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the wireless device may receive CSI configuration information indicating channel measurement resources associated with each of multiple TRPs. The CSI configuration information may be received from a cellular base station, or possibly from multiple cellular base stations (e.g., different portions could be provided from each base station, or redundant provision of the CSI configuration information could be provided from multiple base stations for increased robustness, among various possibilities), according to various embodiments. The CSI configuration information may include any or all of multiple types of configuration information, and may be provided using any or all of RRC messages, MAC CEs, or DCI, among various possibilities.

In some instances, the CSI configuration information may include information configuring sets of possible CSI measurement resources, where different sets of possible CSI measurement resources that are indicated are associated with different TRPs. For example, a CSI resource configuration RRC message (e.g., such as a "CSI-ResourceConfig" RRC message) could include multiple non-zero-power CSI-RS resource sets associated with different TRPs in a NZP-CSI-RS resource set list information element, or could include multiple NZP-CSI-RS resource set list information elements each including a NZP-CSI-RS resource set associated with a different TRP, among various possibilities.

In some instances, the CSI configuration information may include information configuring resources for performing channel measurement for performing (e.g., periodic, semi-persistent, or aperiodic) CSI reporting. Such information may refer to one or more sets of possible CSI measurement resources configured in a CSI resource configuration RRC message, in some instances. For example, a CSI report configuration RRC message (e.g., such as a "CSI-Report-Config" RRC message or a "CSI-AssociatedReportConfig-Info" RRC message) could configure resources for channel measurement that are associated with each of multiple TRPs by indicating those resources for channel measurement associated with one ("first") TRP in one ("first") resources for channel measurement information element of the CSI report configuration RRC message, and by indicating those resources for channel measurement associated with another ("second") TRP in another ("second") resources for channel measurement information element of the CSI report configuration RRC message.

According to some embodiments, it may be possible that the CSI configuration information includes information configuring one or more pairs of CSI-RS resources, where the CSI-RS resources included in the pair are associated with different TRPs, for example for supporting performing multi-TRP channel measurements for non coherent joint transmission (NCJT). Thus, at least as one possibility, if different sets of resources for channel measurement that are associated with different TRPs are configured, each configured pair of CSI-RS resources could include one CSI-RS resource from one set of channel measurement resources and one CSI-RS resource from another set of channel measurement resources. Configuring a limited set of CSI-RS resource pairs for a wireless device to potentially perform multi-TRP channel measurements on in such a manner may help reduce the potential hypothesis testing space for such multi-TRP channel measurements, which may allow for simpler wireless device and/or network implementation, at least in some instances.

Note that such pairs can be indicated by providing information identifying each CSI-RS resource of the pair (e.g., using an index value associated with the CSI-RS resources for each resource of the pair), or by providing information indicating one of the CSI-RS resources (e.g., using an index value associated with the indicated CSI-RS resource, where the other CSI-RS resource has the same index value and is implicitly indicated), among various possibilities. The latter approach may reduce the amount of signaling information needed to indicate a CSI-RS pair, but may also reduce configuration flexibility, at least according to some embodiments.

In some instances, the CSI configuration information may include information explicitly configuring interference measurement resources for performing interference measurement for performing CSI reporting. Additionally or alternatively, in some instances, the interference measurement resources used for performing interference measurement may be restricted and mapped to configured channel measurement resources in a pre-configured (e.g., specified) manner and so may be implicitly configured.

For example, as one possibility, it may be the case that one CSI-IM resources is configured when multiple sets of CSI-RS resources are configured for single CSI reporting. In other words, the wireless device may perform interference measurement for the CSI reporting using a single CSI-interference measurement (IM) resource. It may be the case that the CSI-IM resource is quasi-co-located (QCL) with a corresponding CSI-RS resource used for channel measurement. At least in some instances, such an approach may leverage the possibility that for zero power interference measurement resources, it may be the case that most of the interference present may be inter-cell interference, such that all CSI-IM resources may be (e.g., approximately) equivalently applicable.

As another possibility, the number of zero power interference measurement resources (e.g., CSI-IM) may be configured as being equal to the number of channel measurement resources (e.g., CSI-RS) configured, e.g., such that the number of CSI-IM resources is equal to the total number of CSI-RS resources configured in the sets of CSI-RS resources. In such a scenario, it may be the case that the CSI-IM resources may be mapped one-to-one to the CMR for single TRP interference measurement for the CSI reporting, and/or that multi-TRP interference measurement for the CSI reporting (e.g., for NCJT) may be performed using a pair of CSI-IM resources associated with a corresponding pair of CSI-RS resources indicated in the CSI configuration information.

As a still further possibility, the number of zero power interference measurement resources may be configured as being equal to the number of channel measurement resources configured plus the number of pairs of CSI-RS resources indicated in the CSI configuration information. In such a scenario, it may be the case that the CSI-IM resources may be mapped one-to-one to the CMR for single TRP interference measurement for the CSI reporting, and/or that multi-TRP interference measurement for the CSI reporting may be performed using a CSI-IM resource associated with a corresponding pair of CSI-RS resources indicated in the CSI configuration information.

As yet another possibility, the number of zero power interference measurement resources may be configured as being equal to the number of CMR in the largest of the sets of CMR configured in the CSI configuration information. If desired, the sets of CMR configured in the CSI configuration information may have equal sizes, e.g., to avoid introducing additional complexity. The CMR with the same relative position in different sets of CMR may share the same CSI-IM. Thus, it may be the case that single TRP interference measurement for the CSI reporting may be performed using CSI-IM resources mapped to CSI-RS resources associated with the corresponding TRP. For multi-TRP interference measurement for the CSI reporting, it may be the case that a CSI-IM resource associated with a CSI-RS resource in the larger of the first set of CSI-RS resources or the second set of CSI-RS resources is used for each pair of CSI-RS resources indicated in the CSI configuration information, at least as one possibility.

Note that at least according to some embodiments, it may be the case that non zero power (NZP) interference measurement resources (IMIR) are not configured when multi-TRP CSI reporting is configured (e.g., when multiple sets of CMR are configured in the same CSI report configuration RRC message). Such NZP-IMR may commonly be used for assessing intra-cell interference, e.g., from multi-user-multiple-input-multiple-output (MU-MIMO) operation with other wireless devices in the same cell. Alternatively, it may be the case that one set of NZP-IMR can be configured in such a scenario. It may be the case that the interference measured on such configured NZP-IMR resources is considered to apply to all single TRP and multi-TRP CMR measurements. For spatial filtering (e.g., quasi-co-located (QCL) assumptions, such as QCL-TypeD, and other QCL properties used for NZP-IMR measurement), the NZP IMR may follow QCL information provided for CMR (e.g., qcl-InfoPeriodicCSI-RS configured in a NZP-CSI-RS-Resource IE, as one possibility), or may be determined by the wireless device in any of various other possible ways (e.g., in case different beams may be used for CMR and IMR), among various possibilities.

In 506, the wireless device may perform CSI reporting based at least in part on the CSI configuration information. This may include performing channel measurement using configured channel measurement resources (e.g., CSI-RS configured for channel measurement) to perform single TRP or multi-TRP channel measurements, and/or performing interference measurements using configured interference measurement resources (e.g., one or more CSI-IM mapped to the CSI-RS configured for channel measurement and/or one or more configured NZP-IMR), and transmitting CSI reporting information to the network (e.g., to one or more serving cellular base stations) based at least in part on the measurements performed.

The CSI reporting information received by the network may be used to schedule and perform wireless communications with the wireless device, potentially including to determine whether to schedule multi-TRP or single TRP operation for the wireless device and/or with which beam(s) to communicate with the wireless device, among various possibilities.

Thus, at least according to some embodiments, the method of FIG. 5 may be used to provide a framework according to which a wireless device can be configured to perform channel state information measurements and reporting for multiple TRPs, and thus to assist a cellular network to effectively and efficiently schedule and perform wireless communications with the wireless device, at least in some instances.

FIGS. 6-9 and Additional Information

FIGS. 6-9 illustrate further aspects that might be used in conjunction with the method of FIG. 5 if desired. It should be noted, however, that the exemplary details illustrated in and described with respect to FIGS. 6-9 are not intended to be limiting to the disclosure as a whole: numerous variations and alternatives to the details provided herein below are possible and should be considered within the scope of the disclosure.

In 3GPP Release 16, several different schemes are designed for multi-TRP operation, including schemes for multi-DCI based multi-TRP operation and single-DCI based multi-TRP operation. Single-DCI based Multi-TRP operation schemes may further include a single transport block (TB) spatial division multiplexing (SDM) scheme, a single TB frequency division multiplexing (FDM) scheme, a dual TB FDM scheme, a time domain multiplexing (TDM) scheme with intra-slot repetition, and/or a TDM scheme with inter-slot repetition, according to various embodiments. 3GPP Release 16 does not, however, include channel state information reference signal (CSI-RS) processing enhancements; for example, 3GPP Release 16 does not support performing explicit interference hypothetical testing for improved precoder selection for each TRP, and does not support efficient switching between single TRP and multi-TRP operation.

At least according to some embodiments, CSI reporting may involve reference signal configuration, channel interference measurements, and the configured report quantity or quantities (e.g., CQI, PMI, etc.). The reference signal configuration may include the channel measurement resource (CMR) and interference management resource (IMIR) for the CSI reporting. The IMR may include non-zero-power (NZP) IMR (e.g., NZP-CSI-RS) and/or zero-power (ZP) IMR (e.g., CSI-IM).

It may be possible to enhance various aspects of CSI reporting for multi-TRP operation, potentially including in relation to CMR configuration, CSI-IM configuration, and/or NZP-IMR configuration, e.g., as further described herein.

Currently, a typical CSI measurement configuration in NR may include only one NZP-CSI-RS-ResourceSet for channel measurement resources per CSI-ReportConfig RRC message.

Figure 6:
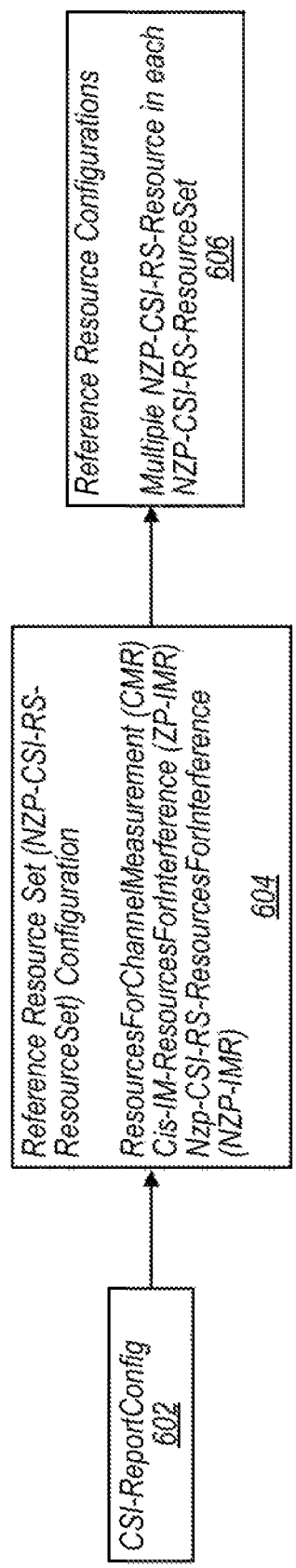
FIG. 6 illustrates exemplary possible aspects of channel measurement resource configuration, according to some embodiments.

For example, as shown in FIG. 6, it may be the case that a CSI-ReportConfig RRC message (602) may include a reference resource set (NZP-CSI-RS-ResourceSet) configuration (604), including resourcesForChannelMeasurement (CMR), csi-IM-ResourcesForInterference (ZP-IMR), and nzp-CSI-RS-ResourcesForInterference (NZP-IMR) IEs. Multiple NZP-CSI-RS-Resources may be configured in each NZP-CSI-RS-ResourceSet (606).

In order to improve support for CSI reporting for multi-TRP operation, it may be beneficial to support configuration of multiple CMR sets, e.g., such that distinct sets of channel measurement resources can be configured for different TRPs.

For example, as one possibility, in the CSI-ReportConfig RRC message, it may be possible to include an additional resourcesForChannelMeasurement IE. Such a new IE could be referred to as "resourcesForChannelMeasurement2-r17", among various other possibilities. At least in some instances, the original resourcesForChannelMeasurement IE in a CSI-ReportConfig RRC message could be defined as corresponding to one ("first") TRP, while the newly added resourcesForChannelMeasurement2-r17 IE in the same CSI-ReportConfig RRC message could be defined as corresponding to a different ("second") TRP.

As another possibility, in aperiodic CSI report configuration, in the CSI-AssociatedReportConfigInfo RRC message, one or more additional resourcesForChannel IEs can be configured. For example, a new "resourcesForChannel2-r17" (or otherwise named) IE could be added to CSI-AssociatedReportConfigInfo, as follows:

```
resourcesForChannel2-r17 CHOICE {
    nzp-CSI-RS SEQUENCE {
        resourceSet INTEGER (1 .. maxNrofNZP-CSI-RS-ResourceSetsPerConfig),
        qcl-info SEQUENCE (SIZE(1 .. maxNrofAP-CSI-RS-ResourcesPerSet)) OF TCI-StateId
            OPTIONAL - Cond Aperiodic
    },
    csi-SSB-ResourceSet INTEGER (1 .. maxNrofCSI-SSB-ResourceSetsPerConfig)
},
```

At east in some instances, the original resourcesForChannel IE in a CSI-AssociatedReportConfigInfo RRC message could be defined as corresponding to one ("first") TRP, while the newly added resourcesForChannel2-r17 IE in the same CSI-ReportConfig RRC message could be defined as corresponding to a different ("second") TRP.

As a further possibility, in the CSI-ResourceConfig RRC message, there may be multiple options for configuring multiple channel measurement resources for multiple TRPs. As one option, it may be supported that up to two sets of NZP-CSI-RS-ResourceSets can be configured in a nzp-CSI-RS-ResourceSetList IE. In such a scenario, it may be the case that the first NZP-CSI-RS-ResourceSet corresponds to one ("first") TRP, while the second NZP-CSI-RS-ResourceSet corresponds to a different ("second") TRP. As another option, it may be supported that an additional csi_RS-ResourceSetList IE can be added to the CSI-ResourceConfig RRC message, for example as follows:

```
csi-RS-ResourceSetList2-r17 CHOICE {
    nzp-CSI-RS-SSB SEQUENCE {
        nzp-CSI-RS-ResourceSetlist SEQUENCE (SIZE (1 .. maxNrofNZP-CSI-RS-ResourceSetsPerConfig)) OF NZP-CSI-RS-ResourceSetId
            OPTIONAL, -- Need R
        csi-SSB-ResourceSetList SEQUENCE (SIZE (1 .. maxNrof-CSI-SSB-ResourceSetsPerConfig)) OF CSI-SSB-ResourceSetId
            OPTIONAL, -- Need R
    },
},
```

In such a scenario, it may be the case that the original csi-RS-ResourceSetList corresponds to one ("first") TRP, while the new csi-RS-ResourceSetList2-r17 corresponds to a different ("second") TRP.

In some instances, it may be the case that in CSI-ReportConfig, two sets of CSI-RS are configured, one for each TRP. The first set may be denoted as A, and may contain $N_1$ CSI-RS resources. The second set may be denoted as B, and may contain $N_2$ CSI-RS resources. It may be the case that the network can configure multiple pairs of CSI-RS for a UE to measure nTRP non-coherent joint transmission (NCJT). For each pair, one CSI-RS may be selected from A, and one CSI-RS may be selected from B. To indicate multiple such pairs, there may be several possible options. As one possibility, for each pair $K_1+K_2$ bits can be used. $K_1$ bits may be used to indicate the CSI-RS in the first set (A), and $K_2$ bits to indicate the CSI-RS in the second set (B). As one possibility, by definition, $K_1=K_2=$the maximum size of the NZP-CSI-RS-ResourceSet may be specified, for example such that for periodic or semi-persistent CSI reporting $K_1=K_{2=8}$ may be specified and for aperiodic CSI reporting $K_1=K_{2=2}$ may be specified. Note that these example values are provided by way of example and that other values are also possible. As another possibility, $K_1$, $K_2$ may depend on the configured size of the sets A and B, e.g., such that:

$K_1=[\log_2$ size of A],
$K_2=[\log_2$ size of B]

As a further possibility, a bitmap can be used, where the bitmap size is the same as the size of set A. Set A and set B may be required to have the same size (i.e., $N_1=N_2$) in such a scenario, at least in some instances. It may be the case that in such a scenario only the CSI-RS with the same index in each set can be paired. Such an approach may reduce the number of bits needed for signaling, but may also reduce resource scheduling flexibility, at least in some instances.

In scenarios in which two sets of CSI-RS are configured for CMR, where set A includes $N_1$ CSI-RS resources for a first TRP and set B includes $N_2$ CSI-RS resources for a second TRP, and K pairs of CSI-RS resources are configured for NCJT measurement, with each pair including one CSI-RS resource selected from set A and one CSI-RS resource selected from set B, there may be several options for configuring or specifying CSI-IM mappings and/or restrictions.

For example, as one possibility, when multiple sets of CSI-RS resources are configured for single CSI reporting, it may be the case that only a single CSI-IM can be configured. In such a scenario, channel interference may be determined based on the single CSI-IM resource, and the QCL of the CSI-IM resource may follow the corresponding CMR measurement.

Figure 7:
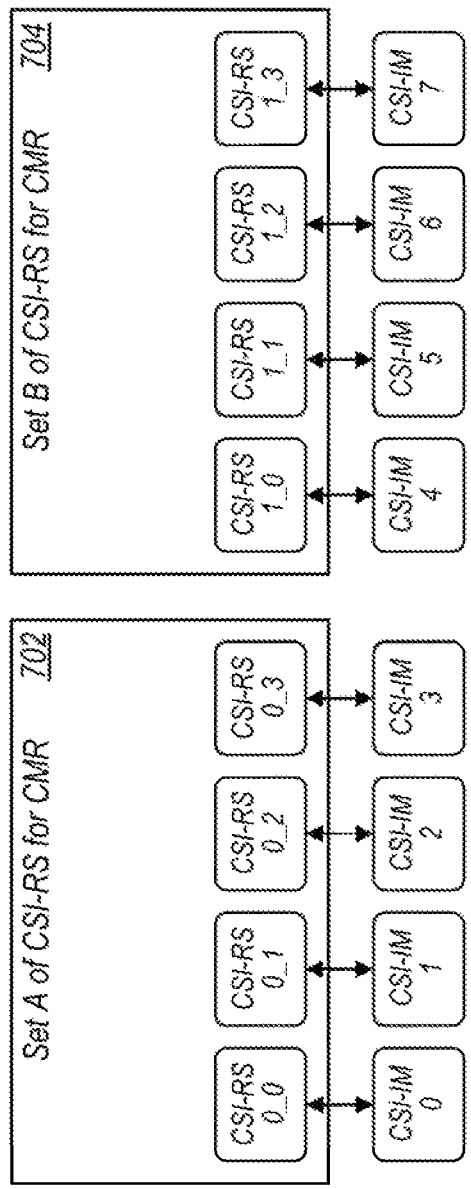
FIGS. 7-9 illustrate exemplary aspects of various possible approaches to channel state information interference measurement resource configuration in a multi-transmission-reception-point wireless communication system, according to some embodiments.

As another possibility, the number of CSI-IM resources may be specified as being equal to the total number of CMR in both set A and set B (i.e., $N_1+N_2$). Thus, each CSI-IM resource may be mapped to one CSI-RS resource; for example, as shown in FIG. 7, CSI-RS resources in set A 702 may be mapped to CSI-IM indices 0-3, while CSI-RS resources in set B 704 may be mapped to CSI-IM indices 4-7. For single TRP measurement, the CSI-IM resource used may be one-to-one mapped to CMR, e.g., in terms of QCL assumption and the interference measurement. For multi-TRP NCJT measurement, in each pair, both CSI-IM resources associated with the corresponding CSI-RS resources in the pair may be considered for interference measurement.

Figure 8:
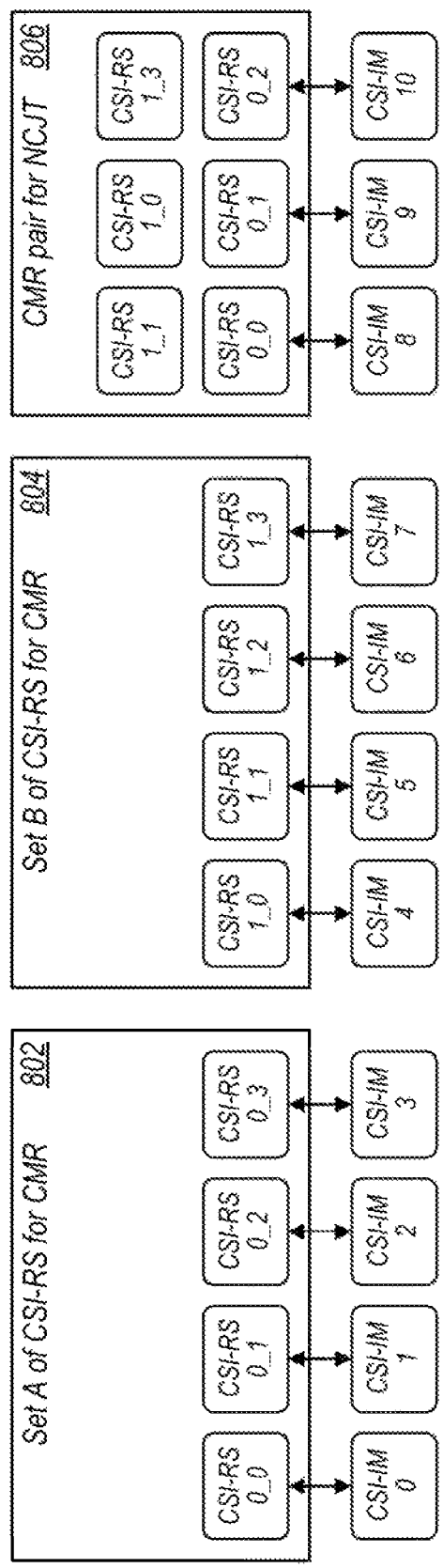

As still another possibility, the number of CSI-IM resources may be specified as being equal to the total number of CMR in both set A and set B plus the number of configured pairs (i.e., $N_1+N_2+K$). Thus, each CSI-RS resource may be mapped to one CSI-IM resource; for example, as shown in FIG. 8, CSI-RS resources in set A 802 may be mapped to CSI-IM indices 0-3, while CSI-RS resources in set B 804 may be mapped to CSI-IM indices 4-7. In addition, each configured CMR pair in the configured CMR pairs for NCJT 806 may be mapped to a CSI-IM (e.g., CSI-IM indices 8-10). For single TRP measurement, the one-to-one mapped (in terms of QCL assumption and interference measurement) CSI-IM resource corresponding to the CMR may be used. For multi-TRP NCJT measurement, the separate CSI-IM mapped to each CMR pair may be used.

Figure 9:
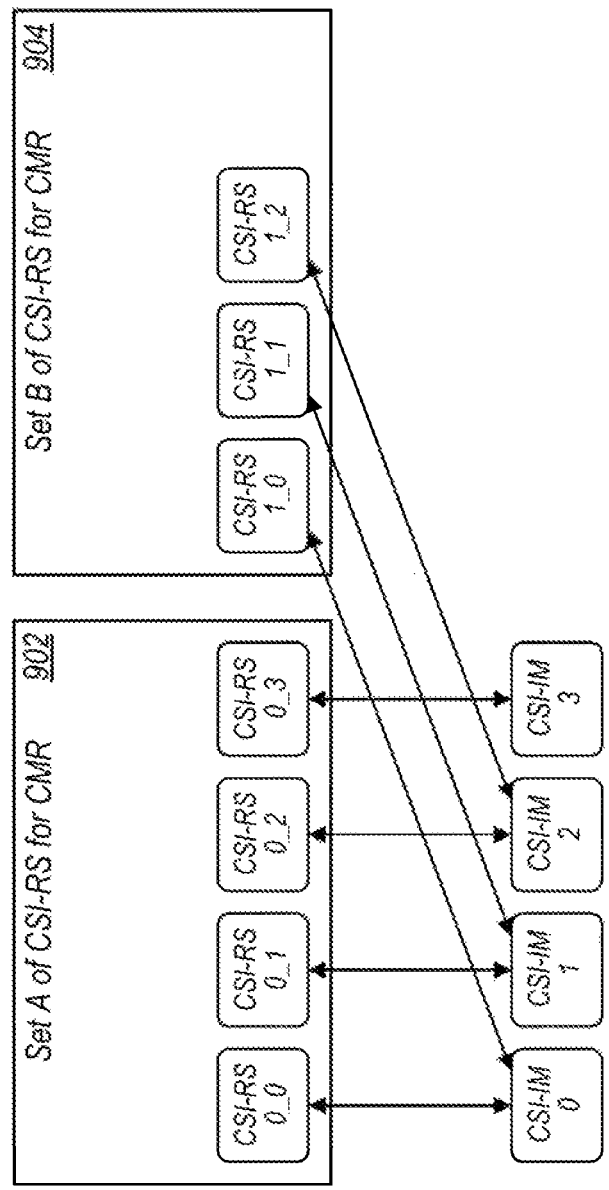

As a further possibility, the number of CSI-IM resources may be specified as being equal to the number of CMR in the larger size set of the sets of CMR (i.e., $\max(N_1, N_2)$). For example, as shown in FIG. 9, in such a scenario, it could be the case that each CSI-RS configured for CMR in set A 902 is one-to-one mapped to a CSI-IM, and that each CSI-RS configured for CMR in set B 904 is also mapped to one of those same CSI-IM. If desired, a restriction that $N_1=N_2$ could be specified, e.g., to reduce implementation complexity. Thus, for single TRP measurement, the CSI-IM resources may be one-to-one mapped to the CMR which follows the set with the larger size. The CSI-RS with the same relative index positions in different CMR sets may share the same CSI-IM. For multi-TRP NCJT measurement, in each pair, the CSI-IM mapped to the CSI-RS in the set with the larger size may be used for QCL and interference measurement.

For NZP-IMR, there may also be multiple configuration and/or specification options. As one possibility, for CSI reporting for multi-TRP operation, when two sets of CMR are configured in the same CSI-ReportConfig indication, it may be specified that NZP-IMR cannot be configured.

As another possibility, for CSI reporting for multi-TRP operation, when two sets of CMR are configured in the same CSI-ReportConfig indication, it may be specified that only one set of NZP-IMR resources can be configured. The interference measured on the configured NZP-IMR resources may apply to all single TRP and multi-TRP CMR measurements. For spatial filtering (e.g., QCL-TypeD, and other QCL properties used for NZP-IMR measurements), it may be the case that it follows the qcl-InfoPeriodicCSI-RS configured in the NZP-CSI-RS-Resource IE, or it may be left to UE implementation, among various possibilities.

In the following further exemplary embodiments are provided.

One set of embodiments may include an apparatus, comprising: a processor configured to cause a wireless device to: receive channel state information (CSI) configuration information, wherein the CSI configuration information indicates channel measurement resources associated with each of multiple transmission reception points (TRPs); and perform CSI reporting based at least in part on the CSI configuration information.

According to some embodiments, the CSI configuration information includes information configuring sets of possible CSI measurement resources, wherein at least a first set of possible CSI measurement resources is associated with a first TRP, wherein at least a second set of possible CSI measurement resources is associated with a second TRP.

According to some embodiments, the first set of possible CSI measurement resources includes a first non-zero-power (NZP) CSI reference signal (RS) resource set indicated in a NZP-CSI-RS resource set list information element (IE) of a CSI resource configuration radio resource control (RRC) message, wherein the second set of possible CSI measurement resources includes a second NZP CSI-RS resource set indicated in the NZP-CSI-RS resource set list IE of the CSI resource configuration RRC message.

According to some embodiments, the first set of possible CSI measurement resources is indicated in a first non-zero-power (NZP) CSI reference signal (RS) resource set list information element (IE) of a CSI resource configuration radio resource control (RRC) message, wherein the second set of possible CSI measurement resources is indicated in a second NZP CSI RS resource set list IE of the CSI resource configuration RRC message.

According to some embodiments, the CSI configuration information includes information configuring first resources for channel measurement associated with a first TRP in a first resources for channel measurement information element (IE) of a CSI report configuration radio resource control (RRC) message, wherein the CSI configuration information includes information configuring second resources for channel measurement associated with a second TRP in a second resources for channel measurement IE of the CSI report configuration RRC message.

According to some embodiments, the CSI configuration information indicates one or more pairs of CSI reference signal (RS) resources, wherein each pair of CSI-RS resources includes a CSI-RS resource associated with a first TRP and a CSI-RS resource associated with a second TRP.

According to some embodiments, the CSI configuration information configures one set of non-zero-power (NZP) interference management resources (IMR) for performing single-TRP and multi-TRP channel interference measurements.

Another set of embodiments may include a method, comprising: by a wireless device: receiving channel state information (CSI) configuration information, wherein the CSI configuration information indicates at least a first set of CSI reference signal (RS) resources associated with a first transmission reception point (TRP) for channel measurement and a second set of CSI-RS resources associated with a second TRP for channel measurement, wherein the CSI configuration information indicates pairs of CSI-RS resources for channel measurement, wherein each pair of CSI-RS resources includes a CSI-RS resource associated with the first TRP and a CSI-RS resource associated with the second TRP; and performing CSI reporting based at least in part on the CSI configuration information.

According to some embodiments, the method further comprises: performing interference measurement for the CSI report using a single CSI-interference measurement (IM) resource, wherein the CSI-IM resource is quasi-co-located (QCL) with a corresponding CSI-RS resource used for channel measurement.

According to some embodiments, the method further comprises: determining that a number of CSI-interference measurement (IM) resources equal to the number of CSI-RS resources in the first set of CSI-RS resources plus the number of CSI-RS resources in the second set of CSI-RS resources are mapped to the CSI-RS resources in the first set of CSI-RS resources and the second set of CSI-RS resources; and performing single TRP interference measurement for the CSI report using CSI-IM resources one-to-one mapped to CSI-RS resources.

According to some embodiments, the method further comprises: determining that a number of CSI-interference measurement (IM) resources equal to the number of CSI-RS resources in the first set of CSI-RS resources plus the number of CSI-RS resources in the second set of CSI-RS resources are mapped to the CSI-RS resources in the first set of CSI-RS resources and the second set of CSI-RS resources; and performing multi-TRP interference measurement for the CSI report using a pair of CSI-IM resources associated with a corresponding pair of CSI-RS resources indicated in the CSI configuration information.

According to some embodiments, the method further comprises: determining that a number of CSI-interference measurement (IM) resources equal to the number of CSI-RS resources in the first set of CSI-RS resources plus the number of CSI-RS resources in the second set of CSI-RS resources plus a number of pairs of CSI-RS resources indicated in the CSI configuration information are mapped to the CSI-RS resources in the first set of CSI-RS resources, the second set of CSI-RS resources, and the pairs of CSI-RS resources indicated in the CSI configuration information; and performing single TRP interference measurement for the CSI report using CSI-IM resources one-to-one mapped to CSI-RS resources.

According to some embodiments, the method further comprises: determining that a number of CSI-interference measurement (IM) resources equal to the number of CSI-RS resources in the first set of CSI-RS resources plus the number of CSI-RS resources in the second set of CSI-RS resources plus a number of pairs of CSI-RS resources indicated in the CSI configuration information are mapped to the CSI-RS resources in the first set of CSI-RS resources, the second set of CSI-RS resources, and the pairs of CSI-RS resources indicated in the CSI configuration information; and performing multi-TRP interference measurement for the CSI report using a CSI-IM resource associated with a corresponding pair of CSI-RS resources indicated in the CSI configuration information.

According to some embodiments, the method further comprises: determining that a number of CSI-interference measurement (IM) resources equal to the larger of the number of CSI-RS resources in the first set of CSI-RS resources or the number of CSI-RS resources in the second set of CSI-RS resources are mapped to the CSI-RS resources in the first set of CSI-RS resources and the second set of CSI-RS resources; and performing single TRP interference measurement for the CSI report using CSI-IM resources mapped to CSI-RS resources associated with the corresponding TRP.

According to some embodiments, the method further comprises: determining that a number of CSI-interference measurement (IM) resources equal to the larger of the number of CSI-RS resources in the first set of CSI-RS resources or the number of CSI-RS resources in the second set of CSI-RS resources are mapped to the CSI-RS resources in the first set of CSI-RS resources and the second set of CSI-RS resources; and performing multi-TRP interference measurement for the CSI report using a CSI-IM resource associated with a CSI-RS resource in the larger of the first set of CSI-RS resources or the second set of CSI-RS resources for each pair of CSI-RS resources indicated in the CSI configuration information.

Yet another set of embodiments may include a cellular base station, comprising: an antenna; a radio operably coupled to the antenna; and a processor operably coupled to the radio; wherein the cellular base station is configured to: provide channel state information (CSI) configuration information to a wireless device, wherein the CSI configuration information configures CSI reporting for multiple transmission reception points (TRPs); and receive CSI reporting for multiple TRPs from the wireless device based at least in part on the CSI configuration information.

According to some embodiments, the CSI configuration information includes information configuring sets of possible CSI measurement resources, wherein at least a first set of possible CSI measurement resources is associated with a first TRP, wherein at least a second set of possible CSI measurement resources is associated with a second TRP.

According to some embodiments, the CSI configuration information includes information configuring first resources for channel measurement associated with a first TRP, wherein the CSI configuration information includes information configuring second resources for channel measurement associated with a second TRP, wherein the CSI configuration information includes information configuring pairs of resources for channel measurement, wherein each pair of resources for channel measurement includes a first resource for channel measurement associated with the first TRP and a second resource for channel measurement associated with the second TRP.

According to some embodiments, non-zero-power (NZP) interference management resources (IMR) are not configured for the wireless device based at least in part on the CSI configuration information configuring CSI reporting for multiple TRPs.

According to some embodiments, the CSI configuration information configures one set of non-zero-power (NZP) interference management resources (IM R) for performing single-TRP and multi-TRP channel interference measurements based at least in part on the CSI configuration information configuring CSI reporting for multiple TRPs.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor, comprising:
memory storing instructions that, when executed, cause a user equipment (UE) to:
receive channel state information (CSI) report configuration information with corresponding sets of channel measurement resources (CMRs) associated with multiple transmission reception points (TRPs) including a first set of $N_1$ channel state information-reference signal (CSI-RS) resources, a second set of $N_2$ CSI-RS resources, and K pairs of CSI-RS resources, wherein the CMRs comprise $N_1+N_2+K$ resources;
perform CSI interference measurements on $N_1+N_2+K$ CSI interference measurement (CSI-IM) resources, wherein each of the CMRs is one-to-one mapped to a CSI-IM resource, wherein the first set of $N_1$ CSI-RS resources are mapped, in ascending order, to first indices for CSI-IM, the second set $N_2$ CSI-RS resources are mapped, in ascending order, to second indices for CSI-IM immediately following the first indices for CSI-IM, and the K pairs of CSI-RS resources are mapped, in ascending order, to last indices for CSI-IM; and
perform CSI reporting associated with the CSI interference and based at least in part on the CSI report configuration information.

2. The baseband processor of claim 1,
wherein the first set of $N_1$ CSI-RS resources is associated with a first TRP, and wherein the second set of $N_2$ CSI-RS resources is associated with a second TRP.

3. The baseband processor of claim 2,
wherein the first set of $N_1$ CSI-RS resources includes a first non-zero-power (NZP) CSI reference signal (RS) resource set indicated in a NZP-CSI-RS resource set list information element (IE) of a CSI resource configuration radio resource control (RRC) message,
wherein the second set of $N_2$ CSI-RS resources includes a second NZP CSI-RS resource set indicated in the NZP-CSI-RS resource set list IE of the CSI resource configuration RRC message.

4. The baseband processor of claim 1,
wherein the CSI report configuration information includes information configuring first resources for channel measurement associated with a first TRP in a first resources for channel measurement information element (IE) of a CSI report configuration radio resource control (RRC) message,
wherein the CSI report configuration information includes information configuring second resources for channel measurement associated with a second TRP in a second resources for channel measurement IE of the CSI report configuration RRC message.

5. The baseband processor of claim 1,
wherein the CSI report configuration information indicates one or more pairs of CSI-RS resources, wherein each pair of CSI-RS resources includes a CSI-RS resource associated with a first TRP and a CSI-RS resource associated with a second TRP.

6. The baseband processor of claim 1,
wherein the CSI report configuration information configures one set of non-zero-power (NZP) interference management resources (IMR) for performing single-TRP and multi-TRP channel interference measurements.

7. A method, comprising:
providing, to a wireless device, channel state information (CSI) report configuration information with corresponding sets of channel measurement resources (CMRs) associated with multiple transmission reception points (TRPs) including a first set of $N_1$ channel state information-reference signal (CSI-RS) resources, a second set of $N_2$ CSI-RS resources, and K pairs of CSI-RS resources, wherein the CMRs comprise $N_1+N_2+K$ resources, wherein to enable the wireless device to perform CSI interference measurements on $N_1+N_2+K$ CSI interference measurement (CSI-IM) resources, each of the CMRs is one-to-one mapped to a CSI-IM resource, wherein the first set of $N_1$ CSI-RS resources are mapped, in ascending order, to first indices for CSI-IM, the second set $N_2$ CSI-RS resources are mapped, in ascending order, to second indices for CSI-IM immediately following the first indices for CSI-IM, and the K pairs of CSI-RS resources are mapped, in ascending order, to last indices for CSI-IM; and receive, for multiple TRPs and from the wireless device, CSI reporting associated with the CSI interference measurements and based at least in part on the CSI configuration information.

8. The method of claim 7,
wherein the first set of $N_1$ CSI-RS resources is associated with a first TRP, and wherein the second set of $N_2$ CSI-RS resources is associated with a second TRP.

9. The method of claim 7,
wherein the CSI report configuration information includes information configuring first resources for channel measurement associated with a first TRP,
wherein the CSI report configuration information includes information configuring second resources for channel measurement associated with a second TRP,
wherein the CSI report configuration information includes information configuring pairs of resources for channel measurement, wherein each pair of resources for channel measurement includes a first resource for channel measurement associated with the first TRP and a second resource for channel measurement associated with the second TRP.

10. The method of claim 7,
wherein non-zero-power (NZP) interference management resources (IMR) are not configured for the wireless device based at least in part on the CSI report configuration information configuring CSI reporting for multiple TRPs.

11. The method of claim 7,
wherein the CSI report configuration information configures one set of non-zero-power (NZP) interference management resources (IMR) for performing single-TRP and multi-TRP channel interference measurements based at least in part on the CSI configuration information configuring CSI reporting for multiple TRPs.

12. A method, comprising:
receiving channel state information (CSI) report configuration information with corresponding channel measurement resources (CMRs) associated with multiple transmission reception points (TRPs) including a first set of $N_1$ channel state information-reference signal (CSI-RS) resources, a second set of $N_2$ CSI-RS resources, and K pairs of CSI-RS resources, wherein the CMRs comprise $N_1+N_2+K$ resources;
performing CSI interference measurements on $N_1+N_2+K$ CSI interference measurement (CSI-IM) resources, wherein each of the CMRs is one-to-one mapped to a CSI-IM resource, wherein the first set of $N_1$ CSI-RS resources are mapped, in ascending order, to first indices for CSI-IM, the second set $N_2$ CSI-RS resources are mapped, in ascending order, to second indices for CSI-IM immediately following the first indices for CSI-IM, and the K pairs of CSI-RS resources are mapped, in ascending order, to last indices for CSI-IM; and performing CSI reporting associated with the CSI interference measurements and based at least in part on the CSI report configuration information.

13. The method of claim 12,
wherein the first set of $N_1$ CSI-RS resources is associated with a first TRP, and wherein the second set of $N_2$ CSI-RS resources is associated with a second TRP.

14. The method of claim 13,
wherein the first set of $N_1$ CSI-RS resources includes a first non-zero-power (NZP) CSI reference signal (RS) resource set indicated in a NZP-CSI-RS resource set list information element (IE) of a CSI resource configuration radio resource control (RRC) message,
wherein the second set of $N_2$ CSI-RS resources includes a second NZP CSI-RS resource set indicated in the NZP-CSI-RS resource set list IE of the CSI resource configuration RRC message.

15. The method of claim 12,
wherein the CSI report configuration information includes information configuring first resources for channel measurement associated with a first TRP in a first resources for channel measurement information element (IE) of a CSI report configuration radio resource control (RRC) message,
wherein the CSI report configuration information includes information configuring second resources for channel measurement associated with a second TRP in a second resources for channel measurement IE of the CSI report configuration RRC message.

16. The method of claim 12,
wherein the CSI report configuration information indicates one or more pairs of CSI-RS resources, wherein each pair of CSI-RS resources includes a CSI-RS resource associated with a first TRP and a CSI-RS resource associated with a second TRP.

17. The method of claim 12,
wherein the CSI report configuration information configures one set of non-zero-power (NZP) interference management resources (IMR) for performing single-TRP and multi-TRP channel interference measurements.

18. The method of claim 12, wherein a number of CSI-interference measurement (IM) resources is equal to a total number of channel measurement resources (CMRs) in both the first set of $N_1$ CSI-RS resources and the second set of $N_2$ CSI-RS resources.

19. The method of claim 12, wherein the CSI report configuration information indicates one or more pairs of CSI-RS resources, wherein each pair of CSI-RS resources includes a CSI-RS resource associated with a first TRP and a CSI-RS resource associated with a second TRP, and wherein a number of CSI-interference measurement (IM) resources is equal to a total number of channel measurement resources (CMRs) in both the first set of $N_1$ CSI-RS resources and the second set of $N_2$ CSI-RS resources plus the one or more pairs of CSI-RS resources.

20. The method of claim 12, wherein a bitmap is used to indicate a first CSI-RS resource and a second CSI-RS resource.

* * * * *